(12) United States Patent
Sullivan et al.

(10) Patent No.: US 7,371,192 B2
(45) Date of Patent: *May 13, 2008

(54) GOLF BALL

(75) Inventors: Michael J. Sullivan, Barrington, RI (US); Derek A. Ladd, Acushnet, MA (US); Antonio U. Desimas, East Providence, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/470,350

(22) Filed: Sep. 6, 2006

(65) Prior Publication Data

US 2007/0026970 A1 Feb. 1, 2007

Related U.S. Application Data

(60) Continuation of application No. 10/974,144, filed on Oct. 27, 2004, now abandoned, which is a division of application No. 10/157,679, filed on May 29, 2002, now Pat. No. 6,852,042, which is a continuation-in-part of application No. 09/842,574, filed on Apr. 26, 2001, now Pat. No. 6,533,682, which is a continuation-in-part of application No. 09/815,753, filed on Mar. 23, 2001, now Pat. No. 6,494,795.

(51) Int. Cl.
A63B 37/06 (2006.01)
(52) U.S. Cl. ....................................... 473/376
(58) Field of Classification Search ................ 473/376, 473/373, 374

See application file for complete search history.

(56) References Cited

U.S. PATENT DOCUMENTS

| 4,431,193 | A | 2/1984 | Nesbitt |
| 4,625,964 | A | 12/1986 | Yamada |
| 5,048,838 | A | 9/1991 | Chikaraishi et al. |
| 5,104,126 | A | 4/1992 | Gentiluomo |
| 5,184,828 | A | 2/1993 | Kim et al. |
| 5,482,285 | A | 1/1996 | Yabuki et al. |

(Continued)

FOREIGN PATENT DOCUMENTS

WO  WO 00/23519  4/2000

(Continued)

*Primary Examiner*—Raeann Trimiew
(74) *Attorney, Agent, or Firm*—Mandi B. Milbank

(57) ABSTRACT

A high CoR golf ball having predetermined moment of inertia is provided. A portion of the golf ball preferably contains substantially no filler, which contributes to the increased resilience of the ball. In accordance with one aspect of the invention, the portion with substantially no filler is an intermediate layer of the ball, and preferably is the outer core layer of the ball. The remaining portions of the ball preferably contribute to the moment of inertia of the ball. To craft a low moment of inertia ball, the innermost core should have a high specific gravity. Additionally, the outermost layers of the ball may have a low specific gravity. Conversely, to craft a high moment of inertia ball, the ball should have a thin dense layer positioned radially outward from its centroid radius. Additionally, the innermost core may have a low specific gravity. To craft a mid range moment of inertia ball, the ball may comprise a high specific gravity inner core and a thin dense layer. Preferably, the portion with substantially no filler is relatively larger than other portions of the ball.

14 Claims, 1 Drawing Sheet

U.S. PATENT DOCUMENTS

| | | |
|---|---|---|
| 5,703,166 A | 12/1997 | Rajagopalan et al. |
| 5,704,854 A | 1/1998 | Higuchi et al. |
| 5,783,293 A | 7/1998 | Lammi |
| 5,810,678 A | 9/1998 | Cavallaro et al. |
| 5,823,889 A | 10/1998 | Aoyama |
| 5,824,746 A | 10/1998 | Harris et al. |
| 5,876,294 A | 3/1999 | Yamagishi et al. |
| 5,885,172 A | 3/1999 | Hebert et al. |
| 5,919,100 A | 7/1999 | Boehm et al. |
| 5,947,843 A | 9/1999 | Calabria et al. |
| 5,981,658 A | 11/1999 | Rajagopalan et al. |
| 5,989,136 A | 11/1999 | Renard et al. |
| 5,993,968 A | 11/1999 | Umezawa et al. |
| 6,010,411 A | 1/2000 | Reyes |
| 6,010,412 A | 1/2000 | Moriyama |
| 6,025,442 A | 2/2000 | Harris et al. |
| 6,030,296 A | 2/2000 | Morgan et al. |
| 6,045,460 A | 4/2000 | Hayashi et al. |
| 6,068,561 A | 5/2000 | Renard et al. |
| 6,071,201 A | 6/2000 | Maruko |
| 6,102,815 A | 8/2000 | Sutherland |
| 6,120,393 A | 9/2000 | Sullivan et al. |
| 6,142,887 A | 11/2000 | Sullivan et al. |
| 6,149,535 A | 11/2000 | Bissonnette et al. |
| 6,152,834 A | 11/2000 | Sullivan |
| 6,220,972 B1 | 4/2001 | Sullivan et al. |
| 6,248,027 B1 | 6/2001 | Hayashi et al. |
| 6,267,692 B1 | 7/2001 | Higuchi et al. |
| 6,277,034 B1 | 8/2001 | Nesbitt et al. |
| 6,431,998 B1 * | 8/2002 | Nakamura et al. .......... 473/371 |
| 6,482,109 B2 | 11/2002 | Nesbitt |
| 6,494,795 B2 | 12/2002 | Sullivan |
| 6,595,874 B2 | 7/2003 | Sullivan |
| 6,616,550 B2 | 9/2003 | Nesbitt |
| 6,616,551 B2 | 9/2003 | Nesbitt |
| 6,638,184 B2 | 10/2003 | Nesbitt |
| 6,685,580 B2 | 2/2004 | Sullivan |
| 6,743,123 B2 | 6/2004 | Sullivan |
| 6,852,042 B2 * | 2/2005 | Sullivan et al. ............. 473/374 |
| 6,913,547 B2 | 7/2005 | Cavallaro |
| 6,945,878 B2 | 9/2005 | Binette et al. |
| 2001/0016524 A1 | 8/2001 | Sullivan et al. ............. 473/378 |

FOREIGN PATENT DOCUMENTS

| | | |
|---|---|---|
| WO | WO 00/57962 | 10/2000 |

* cited by examiner

GOLF BALL

CROSS-REFERENCE TO RELATED APPLICATIONS

This application is a continuation of U.S. application Ser. No. 10/974,144, filed on Oct. 27, 2004 now abandoned, which is a divisional application of U.S. application Ser. No. 10/157,679, entitled "Golf Ball" and filed on May 29, 2002 and issued as U.S. Pat. No. 6,852,042, which is a continuation-in-part of application Ser. No. 09/842,574, which was filed on Apr. 26, 2001 and issued as U.S. Pat. No. 6,533,682, which is a continuation-in-part of application Ser. No. 09/815,753, which was filed on Mar. 23, 2001 and issued as U.S. Pat. No. 6,494,795. The disclosures of the parent applications are incorporated herein by reference in their entireties.

FIELD OF THE INVENTION

The present invention relates to golf balls and more particularly, the invention is directed to golf balls with improved coefficient of restitution and spin rate.

BACKGROUND OF THE INVENTION

The spin rate of golf balls is the end result of many variables, one of which is the distribution of the density or specific gravity within the ball. Spin rate is an important characteristic of golf balls for both skilled and recreational golfers. High spin rate allows the more skilled players, such as PGA professionals and low handicapped players, to maximize control of the golf ball. A high spin rate golf ball is advantageous for an approach shot to the green. The ability to produce and control back spin to stop the ball on the green and side spin to draw or fade the ball substantially improves a player's control over the ball. Hence, the more skilled players generally prefer a golf ball that exhibits high spin rate, in part, off scoring irons, such as the 7-iron club through the pitching wedge.

On the other hand, the recreational players who cannot intentionally control the spin of the ball generally do not prefer a high spin rate golf ball. For these players, slicing and hooking the ball are the more immediate obstacles. When a club head strikes a ball improperly, an unintentional side spin is often imparted to the ball, which sends the ball off its intended course. The side spin reduces a player's control over the ball, as well as the direct-line distance the ball will travel. A golf ball that spins less tends not to drift off-line erratically if the ball is not hit squarely with the club face. A low spin ball will not cure the hook or slice, but will reduce the adverse effects of the side spin. Hence, recreational players typically prefer a golf ball that exhibits low spin rate.

Reallocating the density or specific gravity of the various layers of a golf ball provides an important means of controlling the spin rate. In some instances, the weight from the outer portions of the ball is redistributed toward the center to decrease the moment of inertia, thereby increasing the spin rate. For example, U.S. Pat. No. 4,625,964 discloses a golf ball with a reduced moment of inertia having a core with specific gravity of at least 1.50 and a diameter of less than 32 mm and an intermediate layer of lower specific gravity between the core and the cover. U.S. Pat. No. 5,104,126 discloses a ball with a dense inner core having a specific gravity of at least 1.25 encapsulated by a lower density syntactic foam composition. U.S. Pat. No. 5,048,838 discloses another golf ball with a dense inner core having a diameter in the range of 15-25 mm with a specific gravity of 1.2 to 4.0 and an outer layer with a specific gravity of 0.1 to 3.0 less than the specific gravity of the inner core. U.S. Pat. No. 5,482,285 discloses another golf ball with reduced moment of inertia by reducing the specific gravity of an outer core to 0.2 to 1.0.

In other instances, the weight from the inner portion of the ball is redistributed outward to increase the moment of inertia, thereby decreasing the spin rate. U.S. Pat. No. 6,120,393 discloses a golf ball with a hollow inner layer with one or more resilient outer layers, thereby giving the ball a soft core, and a hard cover. U.S. Pat. No. 6,142,887 discloses an increased moment of inertia golf ball comprising one or more layer layers made from metals, ceramic or composite materials, and a polymeric spherical substrate disposed inwardly from the layer layers.

The redistribution of weight within the golf ball is typically accomplished by adding fillers to the inner core or to an outer layer of the golf ball. Conventional fillers include the high specific gravity fillers, such as metal or metal alloy powders, metal oxide, metal searates, particulates, carbonaceous materials, or low specific gravity fillers, such as hollow spheres, microspheres or foamed particles. However, the addition of fillers may adversely interfere with the inherent resiliency of the polymers used in golf balls and thereby the coefficient of restitution of the golf balls. Hence, there remains a need in the art for a golf ball with controlled moment of inertia that has improved coefficient of restitution.

SUMMARY OF THE INVENTION

The present invention is directed to a golf ball that has a predetermined moment of inertia and an improved coefficient of restitution.

The present invention is also directed to a golf ball that has a predetermined moment of inertia and a resilient zone.

The present invention is also directed to a golf ball that has comprises a portion that has substantially no filler.

The present invention is further directed to a golf ball with multi-layer core, wherein one core layer contains substantially no filler, or in other words it contains filler in an amount that is less than or equal to five parts of filler to 100 parts of polymeric material.

The present invention is directed to a low moment of inertia golf ball comprising a multi-layer core encased by a thin cover having a thickness in the range of about 0.010 inch to about 0.040 inch. The core comprises a high density inner core and an outer core, which contains substantially no filler. The specific gravity of the inner core is preferably greater than about 5.0 and more preferably greater than about 6.5. In accordance to one aspect of the invention, the inner core comprises high specific gravity filler incorporated in a polymeric matrix. Preferably, the filler is a heavy metal powder, such as tungsten. Alternatively, the inner core comprises a metal sphere. The diameter of the inner core is preferably less than 0.75 inch, and more preferably in the range of about 0.25 inch to about 0.50 inch, and most preferably in the range of about 0.40 inch to about 0.50 inch. Preferably, the cover is either a single layer or a multi-layer cover, and preferably the outer core comprises a highly resilient polymeric core material and additives that improves the outer core=s resilience.

The present invention is also directed to a high moment of inertia golf ball comprising a thin dense layer encasing a core. Preferably, the specific gravity of the thin dense layer is higher than the specific gravity of the core, and the core preferably contains substantially no filler. The core preferably has a diameter in the range of about 1.54 inch to about 1.64 inch. In accordance to one aspect of the present invention, the thin dense core comprises a Apre-preg@thin film or a densified loaded film. To increase the moment of inertia, the golf ball may further comprise a low specific gravity inner core. The inner core may be hollow or filled with a low specific gravity liquid. The ball also comprises a single layer cover or preferably a multi-layer cover having a thickness in the range of about 0.010 inch to about 0.040 inch.

The present invention is also directed to a mid range moment of inertia golf ball comprising a high density inner core, a thin dense film and an outer core disposed therebetween. The outer core preferably has substantially no filler. Preferably the inner core is relatively small and the cover is relatively thin.

The present invention is also directed to a golf ball having a thin dense layer encasing a multi-layer core. The inner core preferably has a specific gravity of less than about 0.9 and may have substantially no filler. The outer core preferably has a specific gravity from about 0.5 to about 1.05, and may have substantially no filler. In accordance to one aspect of the invention, the specific gravity of the outer core is higher than the specific gravity of the inner core.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE INVENTION

Figure 1:
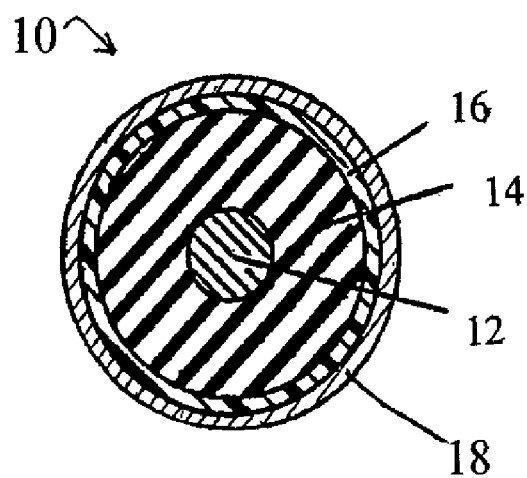
FIG. 1 is a cross-sectional view of a golf ball in accordance to the present invention.

It is well known that the total weight of the ball has to conform to the weight limit set by the United States Golf Association ("USGA"). Redistributing the weight or mass of the ball either toward the center of the ball or toward the outer surface of the ball changes the dynamic characteristics of the ball at impact and in flight. Specifically, if the density is shifted or redistributed toward the center of the ball, the moment of inertia is reduced, and the initial spin rate of the ball as it leaves the golf club would increase due to lower resistance from the ball's moment of inertia. Conversely, if the density is shifted or redistributed toward or within the outer cover, the moment of inertia is increased, and the initial spin rate of the ball as it leaves the golf club would decrease due to the higher resistance from the ball's moment of inertia. The radial distance from the center of the ball or from the outer cover, where moment of inertia switches from being increased and to being decreased as a result of the redistribution of weight or mass density, is an important factor in golf ball design.

In accordance to one aspect of the present invention, this radial distance, hereinafter referred to as the centroid radius, is provided. When more of the ball's mass or weight is reallocated to the volume of the ball from the center to the centroid radius, the moment of inertia is decreased, thereby producing a high spin ball. When more of the ball's mass or weight is reallocated to the volume between the centroid radius and the outer cover, the moment of inertia is increased thereby producing a low spin ball.

The centroid radius can be determined by the following steps:

(a) Setting Ro to half of the 1.68-inch diameter for an average size ball, where Ro is the outer radius of the ball.

(b) Setting the weight of the ball to the USGA legal weight of 1.62 ounce.

(c) Determining the moment of inertia of a ball with evenly distributed density prior to any weight distribution.

The moment of inertia is represented by $(2/5)(Mt)(Ro^2)$, where Mt is the total mass or weight of the ball. For the purpose of this invention, mass and weight can be used interchangeably. The formula for the moment of inertia for a sphere through any diameter is given in the CRC Standard Mathematical Tables, $24^{th}$ Edition, 1976 at 20 (hereinafter CRC reference). The moment of inertia of such a ball is 0.4572 ounce-inch$^2$. This will be the baseline moment of inertia value.

(d) Taking a predetermined amount of weight uniformly from the ball and reallocating this predetermined weight in the form of a thin shell to a location near the center of the ball and calculating the new moment of inertia of the weight redistributed ball.

This moment of inertia is the sum of the inertia of the ball with the reduced weight plus the moment of inertia contributed by the thin shell. This new moment of inertia is expressed as $(2/5)(Mr)(Ro^2)+(2/3)(Ms)(Rs^2)$, where Mr is the reduced weight of the ball; Ms is the weight of the thin shell; and Rs is the radius of the thin shell measured from the center of the ball. Also, Mt=Mr+Ms. The formula of the moment of inertia from a thin shell is also given in the CRC reference.

(e) Comparing the new moment of inertia determined in step (d) to the baseline inertia value determined in step (c) to determine whether the moment of inertia has increased or decreased due to the reallocation of weight, i.e., subtracting the baseline inertia from the new inertia.

(f) Repeating steps (d) and (e) with the same predetermined weight incrementally moving away from the center of the ball until the predetermined weight reaches the outer surface of the ball.

(g) Determining the centroid radius as the radial location where the moment of inertia changes from increasing to decreasing.

(h) Repeating steps (d), (e), (f), and (g) with different predetermined weights and confirming that the centroid radius is the same for each predetermined weight.

In a preferred embodiment of the present invention, the predetermined weight is initially set at a very small weight, e.g., 0.01 ounce, and the location of the thin shell is initially placed at 0.01 inch radially from the center of the ball. The 0.01 ounce thin shell is then moved radially and incrementally away from the center. The moment of inertia and changes in the moment of inertia are determined at each increment. The same procedure is repeated for predetermined weights of 0.20 ounce, 0.405 ounce (or ¼ the weight of the ball), 0.81 ounce (or ½ of the total weight of the ball) and 1.61 ounce (or practically all the weight of the ball). The results are fully disclosed in the two parent applications, whose disclosures have been incorporated by reference. The results show that for each predetermined weight, the centroid radius is located at the same radial distance, i.e., at approximately 0.65 inch radially from the center of a ball weighing 1.62 ounce and with a diameter of 1.68 inches, or 0.19 inch radially from the surface of the ball.

Another advantageous result readily derived from the above procedure is that at a radial distance of less than about 0.25 inch, or more significantly less than about 0.20 inch, from the center of the ball the rate of the reduction in moment of inertia is considerably less than the rate of the reduction in moment of inertia from a radial distance from 0.25 inch to 0.65 inch. In other words, substantially all of the reduction in moment of inertia can be achieved by redistributing the weight of the ball to within an innermost core of about 0.40 inch to 0.50 inch in diameter.

In accordance to another aspect of the present invention, the golf ball 10 comprises a multi-layer core, as illustrated in FIG. 1, having at least an inner core 12 and an outer core layer 14. The multi-layer core is encased in a cover layer, which preferably is a multi-layer cover comprising at least inner cover layer 16 and outer cover layer 18. A preferred way to redistribute the weight of the golf ball is by adding fillers to a selected portion of the golf ball to achieve a desirable moment of inertia. As used herein the term "fillers" include any compound or composition that can be used to vary the density or specific gravity of selected portions of the golf ball. Fillers include high density and low density fillers.

Suitable high density fillers may have specific gravity in the range from about 2 to about 19, and include, for example, metal (or metal alloy) powder, metal oxide, metal searates, particulates, carbonaceous materials, and the like or blends thereof. Examples of useful metal (or metal alloy) powders include, but are not limited to, bismuth powder, boron powder, brass powder, bronze powder, cobalt powder, copper powder, inconel metal powder, iron metal powder, molybdenum powder, nickel powder, stainless steel powder, titanium metal powder, zirconium oxide powder, aluminum flakes, tungsten metal powder, beryllium metal powder, zinc metal powder, or tin metal powder. Examples of metal oxides include but are not limited to zinc oxide, iron oxide, aluminum oxide, titanium dioxide, magnesium oxide, zirconium oxide, and tungsten trioxide. Examples of particulate carbonaceous materials include but are not limited to graphite and carbon black. Examples of other useful fillers include but are not limited to graphite fibers, precipitated hydrated silica, clay, talc, glass fibers, aramid fibers, mica, calcium metasilicate, barium sulfate, zinc sulfide, silicates, diatomaceous earth, calcium carbonate, magnesium carbonate, regrind (which is recycled uncured center material mixed and ground to 30 mesh particle size), manganese powder, and magnesium powder.

A more preferred high density filler is tungsten, tungsten oxide or tungsten metal powder due to its particularly high specific gravity of about 19.

Suitable low density fillers may include hollow spheres or microspheres that can be incorporated into a polymeric matrix of epoxy, urethane, polyester or any suitable binder, where the cured composition has a specific gravity of less than 0.9 or more preferably less than 0.8. Low density fillers in accordance to the present invention may also include air pockets that are present in foamed polymers, such as a polyurethane foam or an integrally skinned polyurethane foam that forms a solid skin of polyurethane over a foamed substrate of the same composition. Foamed polymers also include a nucleated reaction injection molded polyurethane or polyurea, where a gas, typically nitrogen, is essentially whipped into at least one component of the polyurethane, typically, the pre-polymer, prior to component injection into a closed mold where full reaction takes place resulting in a cured polymer having a reduced specific gravity. Foamed polymers also include chemically or physically foamed thermoplastic or thermosetting polymers.

To craft a high moment of inertia or low spin golf ball, high density fillers may be added to outer portions of the ball preferably radially outside of the centroid radius, e.g., an outer core layer or an inner cover layer. Alternatively, low density fillers may be added to the inner portions of the ball preferably radially inside of the centroid radius, eg., an inner core layer. Conversely, to craft a low moment of inertia or high spin golf ball, low density fillers may be added to the outer portions of the ball or high density fillers may be added to inner portions of the golf ball. Additionally, fillers are also used to bring the weight of golf balls to 1.62 ounces, which is the upper weight limit set forth by the United States Golf Association (USGA).

One drawback of using fillers in the golf ball is that the fillers reduce the resilience and the coefficient of restitution (CoR) of the golf ball, and more particularly the CoR of the core or layers where the fillers are added. The CoR in solid core golf balls is a function of the composition of the molded core and of the cover. As discussed above, the molded core and the cover may comprise one or more layers. The CoR is related to the initial velocity of the ball, which must not exceed 250±5 ft/s, which the maximum limit set forth by the USGA. Hence, the CoR of golf balls are maximized and controlled, so that the initial velocity of the ball does not exceed the USGA limit.

A preferred material for the core is rubber, such as polybutadiene. Preferred compositions of the innermost core and the other core layers in accordance to the present invention are discussed below. When fillers, such as zinc oxide when not used in quantity sufficient to effect a full cure of a zinc diacrylate/peroxide PBD system as described below, are mixed with the rubber materials the resilience of the rubber decreases. More specifically, for a range of PGA compression of 30-100 a core made with a high content of polybutadiene and a low content of high density filler has a higher CoR than a core made with a lower content of polybutadiene and a higher content of lower density filler, as disclosed in United States patent publication no. 2001/0016524. This disclosure is incorporated herein by reference.

Compression is measured by applying a spring-loaded force to the golf ball center, golf ball core or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160−Riehle Compression).

To maximize the resilience and CoR of the ball, the core in accordance to the present invention preferably has a deformation zone that is substantially free of fillers. In other words, this zone preferably has the highest possible content of polymeric core materials and more preferably the highest content of polybutadiene rubber. As used herein, the term "substantially free of fillers" means that the filler content is no more than about 5 phr to a 100 phr of rubber either before or after the cross-linking or curing process. The upper limit of filler content accounts for the impurities inherent in the materials that make up the core composition and has no other function other than weight contribution. For example, for a core composition that contains zinc acrylate or zinc diacrylate, a small amount of zinc oxide is added to the composition as an activator. Zinc oxide also reacts with and neutralizes any free acrylic acid that may be present in the zinc acrylate or zinc diacrylate to form zinc acrylate or zinc diacrylate. The zinc acrylate or zinc diacrylate is believed to become a part of the polymeric structure after the cross-linking process. The un-reacted zinc oxide remains in the core and acts as a high density filler. Hence, core deformation zones that have less than 5 phr filler to a 100 phr of rubber are within the scope of the present invention. More preferably, the core deformation zones have less than 3 phr of filler to a 100 phr rubber.

Figure 2:
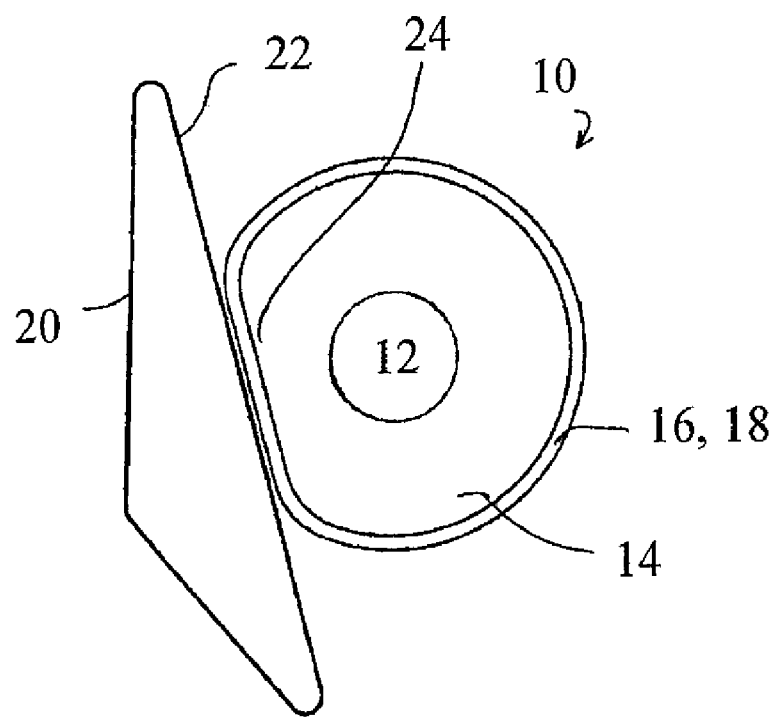
FIG. 2 is a plane view of an impact caused by a club striking a golf club.

Referring to FIG. 1, outer core 14 of a low moment of inertia ball is the core deformation zone and is substantially free of fillers. Preferably, outer core 14 occupies as large a volume of the golf ball as possible. Hence, the inner core 12 preferably has a high specific gravity, or contains a high content of high specific gravity fillers to ensure that ball 10 adheres to the 1.62 ounce USGA limit. Inner core 12 preferably occupies as small a volume as possible. As illustrated in FIG. 2, when club head 20 strikes ball 10, a portion of ball 10 is deformed by the impact with face 22. The deformed portion 24 of outer core 14 is responsible for most of the rebounding of the golf ball core after impact. Hence, as long as the inner core 12 is remote from the deformed portion 24, there is no need to reduce further the size of inner core 12, and thereby unnecessarily increasing the specific gravity of the inner core. Preferably, inner core 12 has a diameter of less than about 0.75 inch, more preferably between about 0.25 inch and 0.50 inch, and most preferably between about 0.40 inch and about 0.50 inch.

In accordance to another aspect of the present invention, minimizing the thickness of the cover layers 16, 18, can also optimize the volume of the core deformation zone. Preferably, the thickness of cover layers 16, 18 ranges from about 0.010 inch to about 0.040 inch, and more preferably ranges from about 0.010 inch to about 0.030 inch. Preferred compositions and properties of the cover layers in accordance to the present invention are described below. Relatively large cores with diameters in the range of 1.60 to 1.64 inches in diameter can be realized with these thin cover layers. However, cores with the diameter in the range of 1.54 inches to 1.64 inches are within the scope of the present invention. It has been discovered that the CoR varies with the rate of deformation of the golf ball. More specifically, the CoR is higher at higher rates of deformation and higher rate of recovery than at lower rates. Hence, when more of the high resilient polymeric material is present in the deformed portion 24 of outer core layer 14, the deformed portion would recover faster. This faster rate of recovery increases the CoR of the core and thereby improving the CoR of the ball.

The compositions of outer core 14 described below are suitable for a high moment of inertia ball, a low moment of inertia ball, and mid-range moment of inertia ball, in accordance to one aspect of the present invention, In one preferred embodiment, the outer core 14 is made from a polybutadiene rubber (PBD) that has a mid Mooney viscosity range greater than about 40, more preferably in the range from about 40 to about 80 and more preferably in the range from about 40 to about 60 Mooney. Polybutadiene rubber with higher Mooney viscosity may also be used, so long as the viscosity of the PBD does not reach a level where the high viscosity PBD clogs or otherwise adversely interferes with the manufacturing machinery. It is contemplated that PBD with viscosity less than 65 Mooney can be used with the present invention. A "Mooney" unit is a unit used to measure the plasticity of raw or unvulcanized rubber. The plasticity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Golf ball cores made with mid to high Mooney viscosity PBD material exhibit increased resiliency, hence distance, without increasing the hardness of the ball. Such cores are soft, i.e., compression less than about 60 and more specifically in the range of about 50-55, and when these soft cores are incorporated into golf balls such cores generate very low spin and long distance when struck by a driver. Cores with compression in the range of from about 30 about 50 are also within the range of this preferred embodiment.

Commercial sources of suitable mid to high Mooney PBD include Bayer AG. "CB 23", which has a Mooney viscosity of about 51 and is a highly linear polybutadiene, is a preferred PBD. If desired, the polybutadiene can also be mixed with other elastomers known in the art, such as natural rubber, styrene butadiene, and/or isoprene in order to further modify the properties of the core. When a mixture of elastomers is used, the amounts of other constituents in the core composition are typically based on 100 parts by weight of the total elastomer mixture.

Other suitable core materials including thermoset plastics, such as natural rubber, other grades of polybutadiene, polyisoprene, styrene-butadiene or styrene-propylene-diene rubber, and thermoplastics such as ionomer resins, polyamides, polyesters, or a thermoplastic elastomer. Suitable thermoplastic elastomers include Pebax®, which is believed to comprise polyether amide copolymers, Hytrel®, which is believed to comprise polyether ester copolymers, thermoplastic urethane, and Kraton®, which is believed to comprise styrenic block copolymers elastomers. These products are commercially available from Elf-Atochem, E. I. Du Pont de Nemours and Company, various manufacturers, and Shell Chemical Company, respectively. The core materials can also be formed from a metal salt of a fatty acid, any partially or fully neutralized ionomer, a metallocene or other catalyzed polymer and a castable material. Suitable castable materials include those comprising a urethane, polyurea, epoxy, silicone, IPN's, etc. Golf ball cores made with these core materials has a PGA compression of preferably less than 90, more preferably less than 80 and most preferably less than 70.

Additionally, other suitable core materials (and cover materials) are disclosed in U.S. Pat. No. 5,919,100 and international publications WO 00/23519 and WO 01/29129. These disclosures are incorporated by reference herein in their entireties. One particularly suitable material disclosed in WO/29129 is a melt processible composition comprising a highly neutralized ethylene copolymer and one or more aliphatic, mono-functional organic acids having fewer than 36 carbon atoms of salts thereof, wherein greater than 90% of all the acid of the ethylene copolymer is neutralized.

In accordance to another aspect of the invention, the addition of sulfur compound to the core further increases the resiliency and the coefficient of restitution of the ball. Preferred sulfur compounds include, but are not limited to, pentachlorothiophenol (PCTP) and a salt of PCTP. A preferred salt of PCTP is ZnPCTP. The utilization of PCTP and ZnPCTP in golf ball cores to produce soft and fast cores is disclosed in co-pending U.S. application Ser. No. 09/951, 963 filed on Sep. 13, 2001, and is assigned to the same assignee as the present invention. This co-pending application is incorporated by reference herein, in its entirety. A suitable PCTP is sold by the Structol Company under the tradename A95. ZnPCTP is commercially available from EchinaChem.

Metal salt diacrylates, dimethacrylates, and monomethacrylates suitable for use in this invention include those wherein the metal is magnesium, calcium, zinc, aluminum, sodium, lithium or nickel. Zinc diacrylate (ZDA) is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. ZDA containing less than about 10% zinc stearate is preferable. More preferable is ZDA containing about 4-8% zinc stearate. Suitable, commercially available zinc diacrylates include those from Sartomer Co. The preferred concentrations of ZDA that can be used are about 25 pph to about 35 pph based upon 100 pph of polybutadiene or alternately, polybutadiene with a mixture of other elastomers that equal 100 pph. Advantageously, the PCTP organic sulfur reacts with the ZDA used in the core to further increase the initial velocity of golf balls.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide, 1,1-di(t-butylperoxy)3,3,5-trimethyl cyclohexane, a-a bis(t-butylperoxy) diisopropylbenzene, 2,5-dimethyl-2,5di(t-butylperoxy)hexane, or di-t-butyl peroxide, and mixtures thereof. Other useful initiators would be readily apparent to one of ordinary skill in the art without any need for experimentation. The initiator(s) at about 70% to about 100% activity are preferably added in an amount ranging between about 0.05 pph and about 2.5 pph based upon 100 parts of butadiene, or butadiene mixed with one or more other elastomers. More preferably, the amount of initiator added ranges between about 0.15 pph and about 2 pph and most preferably between about 0.25 pph and about 1.5 pph. Suitable commercially available dicumyl peroxides include Perkadox BC, which is a 90% active dicumyl peroxide, and DCP 70, which is a 70% active dicumyl peroxide.

As discussed above, when ZDA or another metal salt of diacrylates, dimethacrylates, and monomethacrylates are used in the core, about 5 phr of zinc oxide or less (or a smaller amount of calcium oxide and higher amount of peroxide) is preferably added to the core composition to react and neutralize any acrylic acid that may be present.

Antioxidants may also be included. Antioxidants are compounds, which prevent the breakdown of the elastomer. Antioxidants useful in the present invention include, but are not limited to, quinoline type antioxidants, amine type antioxidants, and phenolic type antioxidants.

Other ingredients such as accelerators, e.g., tetra methylthiuram, processing aids, processing oils, dyes and pigments, as well as other additives well known to the skilled artisan may also be used in the present invention in amounts sufficient to achieve the purpose for which they are typically used.

The outer core 14 of the present invention preferably contains substantially no filters. Preferably, the thickness of the outer core is between about 0.55 inch and 0.62 inch, and more preferably about 0.575 inch. Alternatively, when an outer thin dense layer is used as described below, outer core 14 may be thin, e.g., about 0.05 inch thick, or it may be combined with inner core 12 to form a single layer core having substantially no filler. The preferred specific gravity of the outer core is between about 1.0 and about 1.1. Specific gravity between about 0.5 and about 1.05, and more specifically between about 0.8 and about 0.96 is also suitable for the outer core.

For a low moment of inertia or high spin ball, inner core 12 preferably has a high specific gravity in the range of greater than about 5.0, more preferably greater than about 6.5. As stated above, the preferred diameter of inner core 12 is about 0.4 to about 0.5 inch. Diameters of less than about 0.75 inch or less than about 0.4 inch are also suitable for this embodiment.

In a preferred embodiment of the invention, inner core 12 comprises high density tungsten powder fillers (specific gravity of higher than 19) incorporated into a polymeric matrix, preferably polyurethane. Other high density metal powders, such as lead, can be used. Alternatively, core materials suitable for outer core 14 discussed above are also suitable for inner core 12. Tungsten powder content can be as high as greater than about 1200 phr to 100 phr of polymer.

Alternatively, the core may comprise carbon, stainless or chrome steel spheres that are commercially available as ball bearings in sizes from 1 mm to 20 mm. Preferred sizes in English units are ¼ inch, ⅜ inch, 5⁄16 inch, 7⁄16 inch, ½ inch, ¾ inch or 11⁄16 inch in diameter. Ball bearings made out of mild steel have a specific gravity of about 7.80. Also, stainless steels such as type 1225 has a specific gravity of about 6.5, and type 1650 has a specific gravity of about 7.5.

For a high moment of inertia or low spin ball, inner core 12 preferably has a low specific gravity. As stated above, inner core 12 preferably comprises a polymer containing a density reducing filler, or otherwise has its specific gravity reduced, e.g., by foaming the polymer. The effective specific gravity for this low specific gravity layer is preferably less than about 0.9 and more preferably less than about 0.8.

Alternatively, inner core 12 may be hollow and filled with air (specific gravity of about 0.0013) or alcohol (specific gravity of about 0.79).

As stated above, preferably the thickness of cover layers 16, 18 ranges from about 0.010 inch to about 0.040 inch, and more preferably ranges from about 0.010 inch to about 0.030 inch. The thinness of the cover layers provides more volume, and thereby more resilient polymeric core materials can be included in the core layers.

In a first embodiment the inner and outer cover layers are disclosed in U.S. Pat. No. 5,885,172, which is incorporated herein by reference in its entirety. The outer cover layer 18 is preferably formed from a relatively soft thermoset material in order to replicate the soft feel and high spin play characteristics of a balata ball when the balls of the present invention are used for pitch and other "short game" shots. In particular, the outer cover layer should have a Shore D hardness of from less than about 65 or about 30 to about 60, preferably about 35 to about 50 and most preferably about 40 to about 45. Hardness is preferably measured pursuant to ASTM D-2240 in either button or slab form. Additionally, the materials of the outer cover layer must have a degree of abrasion resistance in order to be suitable for use as a golf ball cover.

The outer cover layer of the present invention can comprise any suitable thermoset material, which is formed from a castable reactive liquid material. The preferred materials for the outer cover layer include, but are not limited to, thermoset urethanes and polyurethanes, thermoset urethane ionomers and thermoset urethane epoxies. Examples of suitable polyurethane ionomers are disclosed in U.S. Pat. No. 5,692,974, the disclosure of which is hereby incorporated by reference herein in its entirety in the present application.

Thermoset polyurethanes and urethanes are particularly preferred for the outer cover layers of the balls of the present invention. Polyurethane is a product of a reaction between a polyurethane prepolymer and a curing agent. The polyurethane prepolymer is a product formed by a reaction between a polyol and a diisocyanate. The curing agent is typically either a diamine or glycol. Often a catalyst is employed to promote the reaction between the curing agent and the polyurethane prepolymer.

Conventionally, thermoset polyurethanes are prepared using a diisocyanate, such as 2,4-toluene diisocyanate (TDI) or methylenebis-(4-cyclohexyl isocyanate) (HMDI) and a polyol which is cured with a polyamine, such as methylenedianiline (MDA), or a trifunctional glycol, such as trimethylol propane, or tetrafunctional glycol, such as N,N,N', N'-tetrakis(2-hydroxpropyl)ethylenediamine. However, the present invention is not limited to just these specific types of thermoset polyurethanes. Quite to the contrary, any suitable thermoset polyurethane may be employed to form the outer cover layer of the present invention.

The inner cover layer 16 of the present invention is formed from a hard, high flexural modulus, resilient material that contributes to the low spin, distance characteristics of the presently claimed balls when they are struck for long shots (e.g. driver or long irons). Specifically, the inner cover layer materials have a Shore D hardness of about 65-80, preferably about 69-74 and most preferably about 70-72. Furthermore, as defined herein, the term "high flexural modulus" means a flexural modulus (as measured by ASTM 790) of at least about 60,000 psi, preferably about 70,000 psi to about 120,000 psi and most preferably at least about 75,000 psi. The thickness of the inner cover layer can range from about 0.010 inch to about 0.045 inch, preferably about 0.150 inch to about 0.040 inch and most preferably about 0.020 inch.

The inner cover layer may be formed from a wide variety of hard, high flexural modulus resilient materials. Among the preferred inner cover materials are hard, high flexural modulus ionomer resins and blends thereof. These ionomers are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0-50 preferably 0-25, most preferably 0-20), weight percent of the polymer, and Y is acrylic or methacrylic acid present in 5-35 (preferably at least about 16, more preferably at least about 16-35, most preferably at least about 16-20) weight percent of the polymer, wherein the acid moiety is neutralized 1-90% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth) acrylic acid/methyl acrylate copolymers.

The manner in which the ionomers are made is well known in the art as described in e.g., U.S. Pat. No. 3,262,272. Such ionomer resins are commercially available from DuPont Co. under the tradename SURLYN® and from Exxon under the tradename Iotek®. Some particularly suitable SURLYNS® include SURLYN® 8140 (Na) and SURLYN® 8546 (Li), which have a methacrylic acid content of about 19%.

However, the materials for the inner cover layer are not limited to ionomer resins. Instead, the present invention contemplates that virtually any hard, high flexural modulus, resilient material that is compatible with the other materials of the golf ball may be employed as the inner cover layer. Examples of other suitable inner cover materials include thermoplastic or thermoset polyurethanes, thermoplastic or thermoset polyetheresters or polyetheramides, thermoplastic or thermoset polyester, a dynamically vulcanized elastomer, a functionalized styrenebutadiene elastomer, a metallocene polymer or blends thereof.

Suitable thermoplastic polyetheresters include materials, which are commercially available from DuPont under the tradename Hytrel®. Suitable thermoplastic polyetheramides include materials, which are available from Elf-Atochem under the tradename Pebax®. Other suitable materials for the inner cover layer include nylon and acrylonitrile-butadiene-styrene copolymer (ABS).

Figure 3:
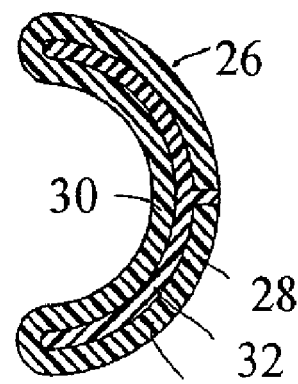
FIG. 3 is a cross-sectional view of a sandwich cover suitable for use with the present invention.

In a second embodiment, a multi-layer cover formed by a sandwich injection molding process, wherein said cover comprises three layers: an inner layer and an outer layer of a first material and an intermediate layer therebetween of a second material. As illustrated in FIG. 3, a sandwich cover 26 comprising outer cover layer 28, inner cover layer 30 and intermediate cover layer 32. The sandwich injection molding process for forming a multi-layer golf ball cover includes the steps of pushing a measured amount of a first plasticized material into one end of an accumulation cylinder, pushing a measured amount of a second plasticized material into the opposite end of the accumulation cylinder, and injecting both materials in a single plunging step, so that the first material substantially coats the surface of the mold while the second material substantially fills the interior of the first material. The first plasticized material cools and solidifies when coming into contact with the surface of the mold. When a lesser amount of the first plasticized material and a faster injection rate are used, thinner inner and outer cover layers can be realized. Hence, a thinner mold cavity can be used to produce a thin multi-layer cover in accordance to the present invention is realized. The sandwich injection molding process is fully described in U.S. Pat. No. 5,783,293. The disclosure of the '293 patent is incorporated herein in its entirety. Sandwich injection molding golf ball covers can also be accomplished with other commercially available apparatus known to those of ordinary skill in the art.

In other preferred embodiment, additional suitable cover materials include those disclosed in U.S. Pat. Nos. 6,419,535, 6,152,834 and 5,919,100 and in international publication Nos. WO 00/23519 and WO 00/57962. These references are incorporated by reference in their entireties. Other suitable cover materials include any partially or fully neutralized ionomer, metallocene or other catalyzed polymers, silicone, other thermoplastic and thermoset elastomers and metal salt of a fatty acid and a melt processible composition comprising a highly neutralized ethylene copolymer and one or more aliphatic, mono-functional organic acids having fewer than 36 carbon atoms of salts thereof, wherein greater than 90% of all the acid of the ethylene copolymer is neutralized. The cover may also comprise a single layer. Alternatively, the cover materials may include a compression molded, injection molded, cast or reaction molded composition comprising a thermoplastic or thermosetting polyurethane or polyurethane copolymer.

To craft a high moment of inertia ball, the cover layers 16, 18 may have high density fillers, such as those described above incorporated therein so long as the cover layers are thin. In other words, one of the cover layers 16, 18, preferably the inner cover layer 16, is a thin dense layer. Thin dense layer 16 may have a thickness from about 0.001 inch to about 0.05 inch (0.025 mm to 1.27 mm), more preferably from about 0.005 inch to about 0.030 inch (0.127 mm to 0.76 mm), and most preferably from about 0.010 inch to about 0.020 inch (0.25 mm to 0.5 mm). Thin dense layer preferably has a specific gravity of greater than about 1.2, more preferably more than about 1.5, even more preferably more than about 1.8 and most preferably more than about 2.0. Preferably, thin dense layer 16 is located as close as possible to the outer surface of the ball. The advantages of locating the thin dense layer as radially outward as possible have been discussed in detail above. Preferably, the thin dense layer is located about 0.030 inch to about 0.110 inch from the outer surface of the ball. It is, however, necessary to locate the thin dense layer outside of the centroid radius.

Except for the moment of inertia, the presence of the thin dense layer preferably does not appreciably affect the overall ball properties, such as the feel, compression, coefficient of restitution, and cover hardness. Suitable materials for the thin dense layer include any material that meets the specific gravity and thickness conditions stated above. The thin dense layer is preferably applied to the core as a liquid solution, dispersion, lacquer, paste, gel, melt, etc., such as a loaded or filled natural or non-natural rubber latex, polyurethane, polyurea, epoxy, polyester, any reactive or non-reactive coating or casting material, and then cured, dried or evaporated down to the equilibrium solids level. The thin dense layer may also be formed by compression or injection molding, RIM, casting, spraying, dipping, powder coating, or any means of depositing materials onto the inner core. The thin dense layer may also be a thermoplastic polymer loaded with a specific gravity increasing filler, fiber, flake or particulate, such that it can be applied as a thin coating and meets the preferred specific gravity levels discussed above.

One particular example of a thin dense layer, which was made from a soft polybutadiene with tungsten powder using the compression molded method, has a thickness of 0.021-0.025 inch (0.53 mm-0.64 mm) and a specific gravity of 1.31 and a Shore C hardness of about 72.

For reactive liquid systems, the suitable materials include any material which reacts to form a solid such as epoxies, styrenated polyesters, polyurethanes or polyureas, liquid PBR's, silicones, silicate gels, agar gels, etc. Casting, RIM, dipping and spraying are the preferred methods of applying a reactive thin dense layer. Non-reactive materials include any combination of a polymer either in melt or flowable form, powder, dissolved or dispersed in a volatile solvent. Suitable thermoplastics are disclosed in U.S. Pat. Nos. 6,149,535 and 6,152,834.

Alternatively, one of the cover layers may be a loaded thin film or "pre-preg" or a "densified loaded film," as described in U.S. Pat. No. 6,010,411 ("the '411 patent) related to golf clubs, may be used as the thin film layer in a compression molded or otherwise in a laminated form applied inside the cover layer 36. The "pre-preg" disclosed in the '411 patent may be used with or without the fiber reinforcement, so long as the preferred specific gravity and preferred thickness levels are satisfied. The loaded film comprises a staged resin film that has a densifier or weighing agent, preferably copper, iron or tungsten powder evenly distributed therein. The resin may be partially cured such that the loaded film forms a malleable sheet that may be cut to desired size and then applied to the outside of the core or inside of the cover. Such films are available from the Cytec of Anaheim, Calif. or Bryte of San Jose, Calif.

Alternative to a high moment of inertia ball and a low moment of inertia ball, a mid-range moment of inertia ball with a relatively large resilient deformation zone can be created. For example, the mid-range ball may comprise a high density inner core 12, a large outer core 14, and thin dense layer 16 and a cover 18. Preferably, the inner core 12 has high density fillers, such as zinc oxide or other filler with specific gravity less than that of tungsten, incorporated in to a polymeric matrix, such as polyurethane or polybutadiene. The thin dense layer positioned radially outside of the centroid radius compensates for the reduction in moment of inertia to produce a mid-range moment of inertia ball.

While various descriptions of the present invention are described above, it is understood that the various features of the present invention can be used singly or in combination thereof Therefore, this invention is not to be limited to the specifically preferred embodiments depicted therein.

What is claimed is:

1. A golf ball comprising:
    a core comprised of an inner core and an outer core, a thin dense layer disposed around the outer core and a cover disposed about the thin dense layer;
    wherein said thin dense layer has a thickness between about 0.001 and about 0.050 inches and a specific gravity of greater than 1.8;
    wherein said inner core comprises a specific-gravity-reducing agent, has a diameter from about 0.50 inch to about 1.54 inches and has a specific gravity of less than 0.9, and
    wherein the outer core has thickness of about 0.05 inch to about 0.575 inch, has a specific gravity of about 0.5 to about 1.05 and is substantially free of fillers.

2. The golf ball of claim 1, wherein the cover has a Shore D hardness of less than 65.

3. The golf ball of claim 2, wherein the cover has a Shore D hardness of less than 60.

4. The golf ball of claim 1, wherein the outer core has a specific gravity of about 0.8 to about 0.96.

5. The golf ball of claim 1, wherein the specific gravity of the outer core is higher than the specific gravity of the inner core.

6. The golf ball of claim 1, wherein the inner core comprises a polymer selected from a group consisting of partially or fully neutralized ionomer, metallocene or other catalyzed polymer, polyurethane, silicone, thermoplastic elastomer, thermosetting elastomer, metal salt of a fatty acid, and melt processable composition, which comprises a highly neutralized ethylene copolymer and one or more aliphatic, mono-functional organic acids having fewer than 36 carbon atoms of salts thereof, wherein greater than 90% of all the acid of the ethylene copolymer is neutralized.

7. The golf ball of claim 1, wherein the cover comprises a material selected from a group consisting of polyurethane, partially or fully neutralized ionomer, polyurea, polyurethane ionomer, metallocene or other catalyzed polymer, silicone, metal salt of a fatty acid and melt processable composition, which comprises a highly neutralized ethylene copolymer and one or more aliphatic, mono-functional organic acids having fewer than 36 carbon atoms of salts thereof, wherein greater than 90% of all the acid of the ethylene copolymer is neutralized.

8. The golf ball of claim 1, wherein the cover comprises a polymer selected from a group consisting of compression molded thermoset polyurethane, compression molded thermoplastic polyurethane, compression molded thermoset polyurethane copolymer, compression molded thermoplastic polyurethane copolymer, injection molded thermoset polyurethane, injection molded thermoplastic polyurethane, injection molded thermoset polyurethane copolymer, injection molded thermoplastic polyurethane copolymer, reaction injection molded thermoset polyurethane, reaction injection molded thermoplastic polyurethane, reaction injection molded thermoset polyurethane copolymer, reaction injection molded thermoplastic polyurethane copolymer, cast thermoplastic polyurethane, cast thermosetting polyurethane, cast thermoplastic polyurethane copolymer, and cast thermosetting polyurethane copolymer.

9. The golf ball of claim 1, wherein in the inner core comprises a polymer selected from a group consisting of chemically foamed thermoplastic, physically foamed thermoplastic, chemically foamed thermoset and physically foamed thermoset.

10. The golf ball of claim 1, wherein the thin dense layer has a specific gravity of greater than 2.0.

11. The golf ball of claim 1, wherein the outer core is formed from a polybutadiene rubber having a Mooney viscosity between about 40 and about 60.

12. The golf ball of claim 1, wherein the core has a compression of less than 80.

13. The golf ball of claim 1, wherein the outer core is a deformation zone that is substantially free of filler such that it has the highest content of polybutadiene rubber.

14. The golf ball of claim 13, wherein the outer core is comprised of a zinc diacrylate containing less than about 10% zinc stearate.

* * * * *